Patented Oct. 7, 1924.

1,510,598

UNITED STATES PATENT OFFICE.

ALFRED T. LARSON, OF WASHINGTON, DISTRICT OF COLUMBIA, ASSIGNOR TO ARTHUR B. LAMB, TRUSTEE, OF CAMBRIDGE, MASSACHUSETTS.

CATALYST AND PROCESS OF PRODUCING THE SAME.

No Drawing.     Application filed November 10, 1923. Serial No. 673,879.

*To all whom it may concern:*

Be it known that I, ALFRED T. LARSON, a citizen of the United States, residing in Washington, District of Columbia, have invented new and useful Improvements in Catalysts and Processes of Producing the Same, of which the following is a specification.

My invention relates more particularly to the production of a catalyst, or a catalytic material, for use in the synthetic production of ammonia from nitrogen and hydrogen.

The present application is in part a continuation of my previously filed applications, Serial No. 449,521, filed March 3, 1921, and Serial No. 573,741, filed July 8, 1922.

In my said former application I made reference to the use of catalysts, including iron, for the production of ammonia, and stated that, whereas oxides of most of the metals had been suggested as promoters for, or promotive additions to, such catalysts, I had, however, discovered that an indiscriminate selection of one or more of such oxides for addition to the catalyst not only does not produce a catalyst having superior catalytic properties or activity, or impart increased or prolonged catalytic powers thereto, but that in many instances the proposed oxides have quite the opposite effect, are detrimental additions to, and impair or destroy the catalytic power of the catalyst.

In my said applications I disclosed my discovery of the principle that when a plurality of metal oxides mutually or reciprocally related one to another as respectively basic and acidic, or as electropositive and electronegative, were added to the catalyst, a marked improvement in its catalytic power was obtained. I have designated promotive additions of this character as composite, or multi-component, promoters.

My present invention is in accordance with this principle, and, pursuant thereto, I employ an oxide of cæsium in combination with an oxide of aluminium to form a composite promoter for addition to the main catalytic agent, whether the latter consists of one or a plurality of catalytic substances. For example, the composite promoter specified may be added to iron or iron oxide, or to cobalt, or to a mixture or compound of these metals or their oxides, or of one of them with other metals or oxides. The composite promoter above described may also be employed with other materials or compounds or mixtures having catalytic properties particularly those whose catalytic properties are favorable to the synthesis of ammonia.

In carrying out my invention the substances employed to produce the catalyst may be the oxides, as such, or the metals or elements thereof that form oxides when heated in an oxidizing atmosphere; or they may be compounds or salts of such metals, such as hydroxides, carbonates, nitrates, or organic salts or compounds thereof, that on heating will become converted to the respective oxides. Also naturally-occurring minerals or compounds that contain the specified components, or which on heating at appropriate temperature will become converted into the said components, may, of course, be employed.

As a general example illustrating my invention, I have found that when an oxide of cæsium and an oxide of aluminium are added to what I have termed the catalyst proper,—e. g., iron,—and the mixture is reduced in hydrogen at a comparatively low temperature, say below 600 degrees C., a catalyst is obtaned having increased and prolonged catalytic powers that is well suited for the synthetic production of ammonia. The proportions of the oxides of cæsium and aluminium may be from substantially 0.25% to 2% of cæsium oxide, and 0.25% to 10% of aluminium oxide by weight of the total catalytic material, calculated as oxides.

As pointed out in my former applications, certain substances when present in the catalyst impair or substantially destroy its catalytic power. Such substances are sometimes designated catalyst "poisons." In preparing a catalyst of best activity embodying my invention, such poisons are to be carefully excluded. Among such poisons are flourine, chlorine, bromine, iodine, sulphur, selenium, tellurium, phosphorus, arsenic, antimony, bismuth, lead, tin, boron, and compounds containing the same.

In order to more specifically illustrate my invention (though not as limiting the same) I give the following example: Add to molten iron oxide a mixture consisting of approximately two (2) per cent of cæsium oxide and two (2) per cent of aluminium oxide. The total weight of the promoter mixture is thus approximately four (4) per cent of the total weight of the mass of the catalyst or catalytic material. Stir the molten mixture, allow to cool and break into small pieces. The pieces of catalyst so produced are now placed in a suitable container and reduced with hydrogen, or a mixture of hydrogen and nitrogen, the reducing gas or gases being free from catalyst poisons. The initial stages of the reduction should preferably be at a relatively low temperature, approximately 300-400 degrees C. The temperature of reduction is then slowly increased until that temperature has been reached at which it is proposed to conduct the catalytic reaction. Ammonia can now be produced if a current of gas containing three volumes of hydrogen and one volume of nitrogen free from catalyst poisons is passed through this catalytic material while maintaining a temperature of about 400-500 degrees C., the gases being at atmospheric or greater pressure.

Various modifications or changes may be made in the details of my invention without departing from the principle thereof.

What I claim is—

1. An active catalyst for the manufacture of ammonia from its elements, consisting of a substance having catalytic properties and a composite promoter, said composite promoter being free from catalyst poisons and comprising an oxide of cæsium and an oxide of an element acidic or electro-negative with respect thereto.

2. An active catalyst for the manufacture of ammonia from its elements, consisting of a substance having catalytic properties and a composite promoter, said composite promoter being free from catalyst poisons and comprising an oxide of cæsium and aluminium oxide.

3. An active catalyst for the manufacture of ammonia from its elements containing iron and a composite promoter, said composite promoter being free from catalyst poisons and comprising an oxide of cæsium and aluminium oxide.

4. An active catalyst for the manufacture of ammonia from its elements, consisting of iron and a composite promoter, said composite promoter being free from catalyst poisons and comprising 0.25% to 2% of cæsium oxide and 0.25% to 10% of aluminium oxide by weight of the total catalytic material calculated as oxides.

5. An active catalyst for the manufacture of ammonia from its elements, said catalyst consisting of the reduction product of a mixture composed of iron oxide, and a composite promoter free from catalyst poisons and comprising cæsium oxide and aluminium oxide.

6. An active catalyst for the manufacture of ammonia from its elements, said catalyst consisting of the reduction product of a mixture composed of iron oxide and a composite promoter, said composite promoter being free from catalyst poisons and comprising 0.25 to 2% of cæsium oxide and 0.25 to 10% of aluminium oxide, by weight of the total catalytic material calculated as oxides.

7. A process for producing an active catalyst for the manufacture of ammonia from its elements, which comprises melting together iron oxide and a composite promoter, said promoter being free from catalyst poisons, and comprising cæsium oxide and aluminium oxide, the cæsium oxide being in the proportion of 0.25 to 2%, the aluminium oxide being in the proportion of 0.25 to 10% by weight of the total catalytic material, calculated as oxides; allowing the mass to cool, breaking the same into suitably sized fragments for use, and reducing the fragments with hydrogen at a temperature of 300-600° C.

ALFRED T. LARSON.